United States Patent [19]
Voigt

[11] Patent Number: 4,769,572
[45] Date of Patent: Sep. 6, 1988

[54] ELECTRICAL APPLIANCE FOR PERSONAL USE

[75] Inventor: Gottfried Voigt, Frankfurt, Fed. Rep. of Germany

[73] Assignee: Braun Aktiengesellschaft, Kronberg, Fed. Rep. of Germany

[21] Appl. No.: 52,573

[22] Filed: May 20, 1987

[30] Foreign Application Priority Data

May 26, 1986 [DE] Fed. Rep. of Germany ....... 3617684

[51] Int. Cl.⁴ ...................... H02K 13/00; A45D 20/00
[52] U.S. Cl. .................................. 310/68 D; 219/370; 310/239
[58] Field of Search .......... 219/370; 310/68 R, 68 D, 310/50, 239, 242, 247, 249

[56] References Cited
U.S. PATENT DOCUMENTS 3,924,147 12/1975 Tarnow .
4,196,343 4/1980 Han ..................... 219/370
4,404,488 9/1983 Herr ..................... 310/68 R
4,459,499 7/1984 Bonecker et al. ................ 310/68 R
4,673,837 6/1987 Gingerich et al. ................... 310/239

FOREIGN PATENT DOCUMENTS 53-147905 12/1978 Japan .
588835 6/1977 Switzerland .

Primary Examiner—Patrick R. Salce
Assistant Examiner—D. L. Rebsch

[57] ABSTRACT

An electric motor of a hair dryer has a stamped metal carrier serving for the preassembly of a diode bridge circuit and brushes and springs for the electric motor. The carrier, together with its preassembled components, can be mounted in an end shield of the electric motor, which end shield is provided, with suitable clearance spaces for this purpose. The entire assembly can then be easily slipped onto the commutator of the electric motor provided in the hair dryer housing.

11 Claims, 2 Drawing Sheets

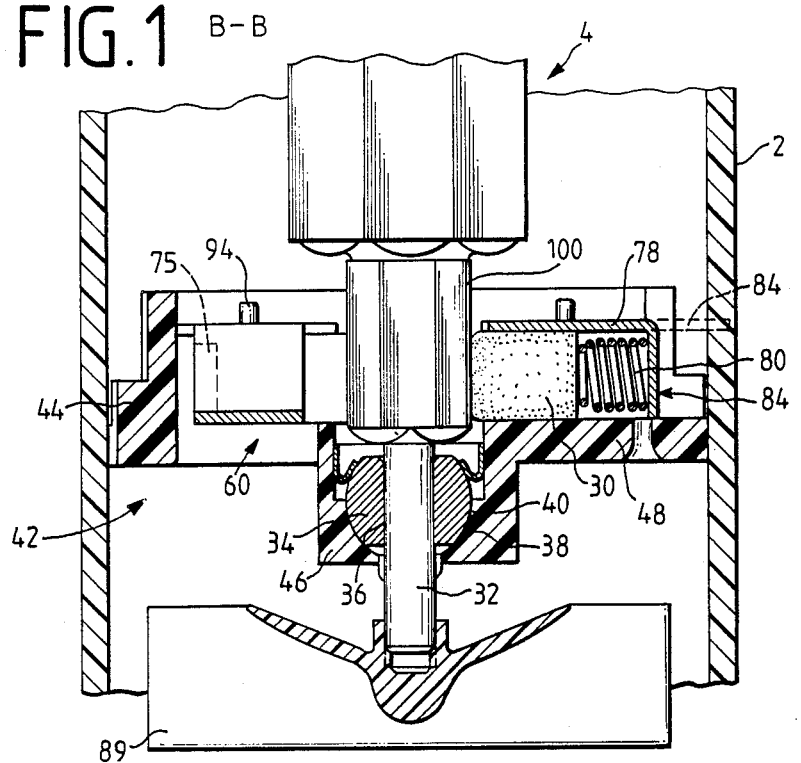
FIG.1 B-B
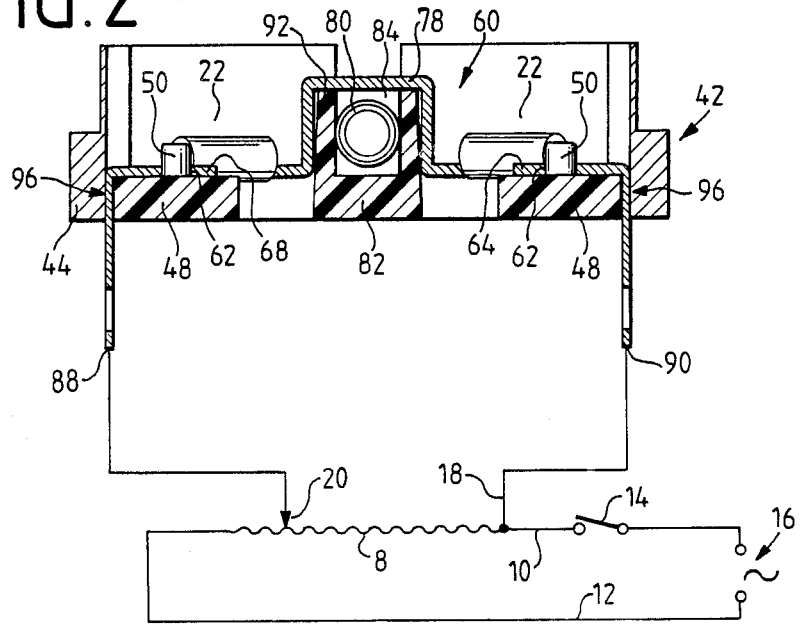
FIG.2 A-A

ELECTRICAL APPLIANCE FOR PERSONAL USE

This invention relates to an electrical appliance, in particular for personal use, including an electric motor which is carried in a housing, is adapted to be operated by direct current and is provided with an end shield, the motor being adapted to be connected to a source of AC power directly or indirectly through diodes mounted on a carrier.

From Swiss Patent Specification No. 588,835, a hair dryer is already known having a DC motor carried by an end shield and having its associated diodes mounted on a separate board. The end shield of the electric motor which shield serves to accommodate brush and spring is configured such that the board is received somewhere else in the housing of the hair dryer, making the assembly of the electric motor in the end shield and the connection of the diodes to the electric motor very complex and thus costly. In addition, such an arrangement requires a great deal of space.

By contrast, it is an object of the present invention to arrange the diodes, or the diodes and the brushes, for the electric motor in such a manner that they can be assembled or preassembled with relative ease while having minimum space requirements. The advantageous arrangement of the diodes on the carrier and the integration of the carrier into the end shield for accommodating the motor have the effect of reducing the space requirements for these components to a minimum in addition to substantially reducing assembly time. Thus, a very low-cost arrangement is obtained. Further space for mounting the diodes may also be saved by having the diodes surround coaxially at least part of the electric motor or collector and by arranging the diodes as well as the brushes in about one plane. However, under other structural conditions as, for example, in the use of brushes fitted to leaf springs arranging the diodes and brushes in two planes may also prove favorable.

Advantageously, the carrier for receiving the diodes is configured such as to be in a position to receive also both the brushes and the associated springs. Thus, all diodes of, for example, a bridge circuit can be preassembled on the carrier to be subsequently mounted in the end shield as a preassembly. In this arrangement, the diodes surround parts of the motor, that is, the shaft or collector thereof, coaxially. The carrier for receiving the diodes is comprises of several plates or components linked by tie members and having holes into which the leads of the diodes may be plugged. When plugged in, the diodes can be secured to the plate easily by soldering. Alternative possibilities of securing the diodes include cutting the diodes to length, inserting the diode leads into trough-shaped depressions provided on the plates and producing a stable connection by means of soldering, clamping or welding operations. Moreover, two opposite plates for receiving the diodes combine to form a housing which thus serves the additional purpose of receiving the brush and its associated spring. The housing for accommodating the brush is of U-shaped configuration having at its bottom a land which, prior to the assembly, extends in a common plane with the bottom. Upon the insertion of brush and spring into the housing, the land may be approached to the outer side of the housing, thus closing the housing relative to the outside.

A good arrangement of the plates is realized by placing the plates in diametrically opposite pairs adapted to fit into suitable clearance spaces provided in the end shield. The housing for receiving brush and spring is complemented by its counterpart provided in the end shield, which counterpart is equally configured as a U-shaped housing. As the carrier is mounted in the end shield, the U-shaped housing of the carrier is placed over the U-shaped housing of the end shield, thereby completing the housing in a simple manner. This arrangement also provides a good support of the carrier in the end shield, enabling the end shield and the carrier to be preassembled into an assembly easily.

Advantageously, the end shield is comprised of a substantially annular body including a bearing connected with the annular body by means of four tie members arranged in cross shape. Small deformable pins may be provided on the tie members of the end shield for locking engagement with bores provided in the carrier to thereby ensure, following their deformation, that the carrier is securely held in the end shield. After the carrier including the associated diodes is mounted in the end shield, the tie members linking the plates can be severed because the diodes will then assume part of the function of the tie members, providing the carrier with the necessary stability. The tie members linking the plates thus serve to facilitate the attachment of the diodes to the carrier. The advantageous carrier configuration also makes it possible for the four diodes to be fitted automatically in the form of a bridge circuit, so that the production time involving the assembly of the diodes and the associated brush and springs can be reduced to a minimum. Since the longitudinal axis of the diodes extends parallel to the longitudinal axis of the tie members linking the individual plates, the diodes can easily assume the function of the tie members after the tie members are severed.

Further, it is an advantage to provide on at least two opposite plates lugs which serve to connect the individual inputs. Also, the tie members cooperate with the annular body of the end shield to form four openings providing a simple means for receiving the diodes, so that additional space savings may be realized by this arrangement.

The invention will now be described in more detail with reference to the accompanying drawings illustrating only one embodiment thereof. In the drawings, FIG. 1 is a sectional view of a housing with an end shield for receiving the electric motor, taken on the line B—B of FIG. 3;

FIG. 2 is a sectional view taken on the line A—A of FIG. 3;

Figure 3:
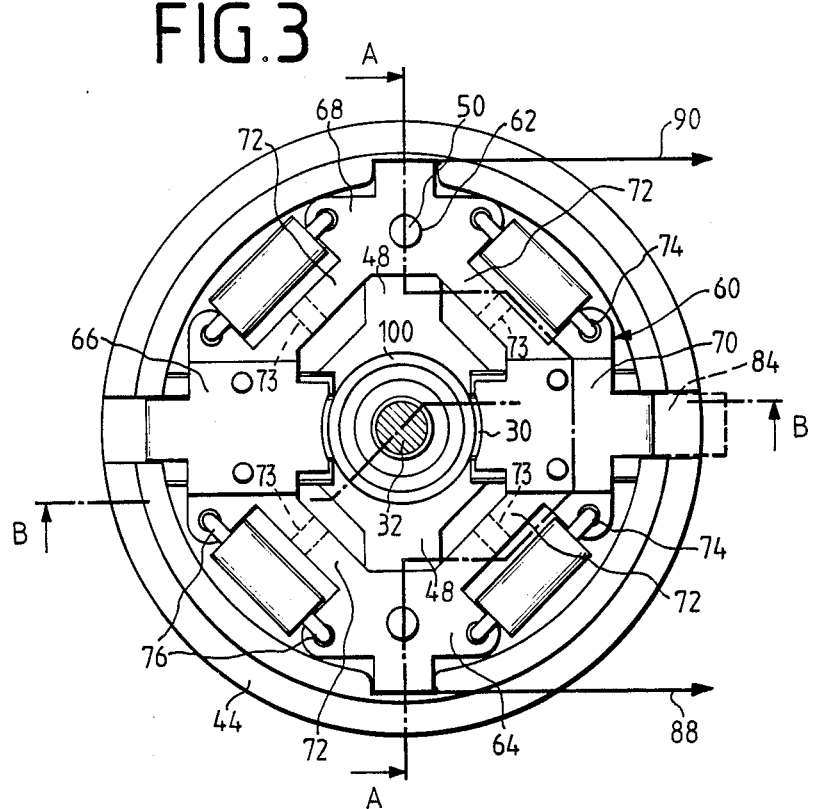
FIG. 3 is a top plan view of the end shield and the carrier for receiving the diodes.
Figure 4:
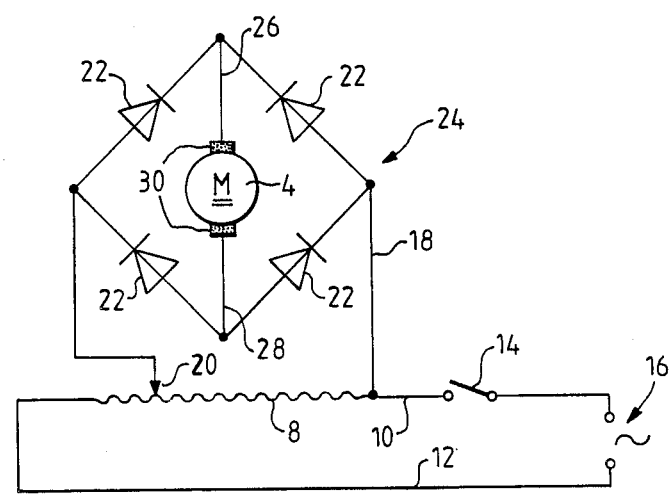
FIG. 4 is an electrical schematic of the electric motor and the associated heating means.

In the drawings, reference numeral 2 identifies a housing of, for example, a hair dryer. The housing 2 illustrated in FIG. 1 may also be provided for use as a housing for an oral jet device or some other electrical appliance, in particular for personal use, which is equipped with a direct-current motor 4. A heating means 8 shown only schematically in FIGS. 2 and 4 is adapted to be connected to a power plug 16 through electrical leads 10 and 12. Inserted in electrical lead 10 is an on/off switch 14. The electric heating means 8 may be operated on a 220-volt AC supply, for example. As becomes apparent from FIG. 4, the input side of the heating means 8 has connected to it an electrical lead 18 and a tap 20 which are connected to a bridge circuit 24 including four diodes 22. Direct current is supplied to the electric motor 4 through the bridge circuit 24. The direct-current motor 4 may be designed for a power of 20 to 60 W, approximately. To this end, the tap 20 is connected to a suitable point between the input and output side of the heating means 8. The bridge circuit 24 is connected to the direct-current motor 4 through two lines 26 and 28 and one carbon brush 30 each. The wiring and arrangement of the direct-current motor 4 shown in FIG. 4 are illustrated in greater detail in FIGS. 1 and 2.

As shown in FIG. 1, the direct-current motor 4 has at its one end a shaft 32 held in an adjustable bearing 34 which for this purpose is provided with a cylindrical bore 36 and a spherical surface 38. The bearing 34 is received in a bearing shell 40 and is universally movable within a specific range, thereby enabling the direct-current motor 4 to be aligned in the housing 2 optimally. The other end of the shaft 32 of the direct-current motor 4, which end is not shown in the drawing, is held in the housing 2 in a similar manner.

The bearing shell 40 for receiving the adjustable bearing 34 is provided in an end shield 42 having on it outer periphery locking means, not shown in the drawing, for locking engagement with suitable counterparts provided in the housing 2. The end shield 42 is a member of plastic material and comprises an annular plastic body 44 and a bearing housing 46 arranged coaxially with the annular body 44, the bearing housing accommodating the spherical bearing shell 40 which serves to receive the bearing 34. The bearing housing 46 is fixedly connected with the inside of the annular body 44 through four tie members 48 arranged in cross shape. The tie members 48 have small pins 50 extending axially through bores 62 provided in a carrier 60, thereby fixing the carrier coaxially integrated into the end shield in its mounted position. After the carrier 60 is mounted in the end shield 42, the pins 50 may be deformed, in particular at their upper ends, by ultrasound or some other techniques, such as to establish a fixed connection between the carrier 60 and the end shield 42. The carrier 60 comprises sheet metal parts or plates 64 to 70 diametrically opposite in pairs and linked by four tie portions 72. Each plate 64 to 70 has two bores 74 into which the leads 76 of the diodes 22 are introduced to be soldered to the plate. Because the plates 64 to 70 are all fixedly interconnected and bores 74 are arranged in a single plane, the assembly of the diodes 22 can be accomplished with relative ease and very speedily. After the diodes 22 are soldered to the plates 64 to 70, the tie portions 72 can be severed as indicated by broken lines 73 since the diodes will then assume the function of the ties, holding the individual plates together. Advantageously, the tie portions 72 may also be pierced with the carrier 60 already in its mounted position in the end shield 42. Alternative possibilities of securing the diodes include cutting the diodes to length, inserting the diode leads into trough-shaped depressions provided on the plates and producing a stable connection by means of soldering, clamping or welding operations.

It is within the scope of the present invention to substitute for the conventional diodes having two leads diodes in the form of single semiconductors or chips which, applying known techniques, are directly attached to the carrier 60 by bonding or soldering and, where necessary, to provide them subsequently with a protective enclosure. In such an embodiment, for example, the chip or crystal may be arranged in the area of one of the redundant bores 74 of the plates 64 to 70, with a wire or the like establishing a connection with the area of the other redundant bore 74 of the plates 64 to 70. Similar to the use of conventional diodes, the tie members are subsequently severed and the chips or crystals are surrounded by an enclosure.

As indicated by the broken lines 75 in FIG. 1 with respect to part of the carrier 60, an advantageous embodiment provides for the mounting means of the diodes 22 to be arranged at resilient elements at least in the area adjacent to the housings 78. In this embodiment, a slot-shaped space (FIG. 1) or clearance is provided in the plates in the area indicated by the broken lines 75. By resiliently securing at least one lead of each diode 22 to the carrier 60, the occurrence of forces acting on the diodes 22 as the tie portions 72 are severed is counteracted, and potential damage to the diodes is avoided.

As becomes apparent particularly from FIG. 1, a U-shaped housing 78 for accommodating the carbon brush 30 and a spring 80 is provided between the two bores 74 of each of the two diametrically opposite plates 66 and 70 (FIGS. 1, 2). The U-shaped housing 78 is likewise fixedly connected with the tie portions 72 and is held in its position by means of the diodes and the pins 50 after the tie portions 72 are pierced. An additional means for holding the housing 78 in position is a housing 82 of likewise U-shaped configuration over which the U-shaped housing 78 is placed (see FIG. 2), thereby providing a chamber into which the carbon 30 and the spring 80 can be introduced radially from the outside. Following the insertion of carbon 30 and spring 80 into the chamber 78 and 82, a land 84 provided on the bottom of the housing 78 can be folded downwards at right angles, thus enabling the spring 80 to take support upon the land 84. It is possible to fold down the land 84 already prior to mounting the carrier 60 in the end shield 42. It is, however, particularly advantageous to insert first the carrier 60 into the end shield 42 before radially introducing the carbon brush 30 and the spring 80 into the chamber 78, 82 and finally to fold down the land 84 at right angles so it abuts against spring 80.

After the individual diodes 22 and, where applicable, the carbon brush 30 and springs 80 are attached to the carrier 60, the preassembled carrier 60 can be mounted in the end shield 42 to be subsequently inserted into the housing 2 for connection therewith. Then the shaft 32 of the electric motor 4 is introduced into the bore 36 of the bearing 34 and a fan wheel 89 is secured to the free end of the shaft 32. Subsequently, the terminal leads 88 and 90 can be connected to the tap 20 and the line 18, respectively (see FIG. 2).

It will be apparent from the foregoing that the individual plates 64 to 70, as well as the housings 78 for receiving the brushes, may be manufactured in a single operation. Further, the advantageous arrangement of the carrier 60 substantially simplifies the mounting of the individual diodes 22 because they, too, can be attached to and soldered on the carrier in a single operation prior to securing the carrier 60 together with the end shield 42 in the housing 2 of the hair dryer or some other electrical appliance for personal use. It is thereby possible to reduce the assembly costs as a whole and to bring down the price of the device. By means of the deformable pins 50 provided on the end shield or on the tie members, the carrier 60 is securely fastened to the end shield 42. Additional pins extending axially may be provided on the side walls 92 of the housing 82 for locking engagement with corresponding bores in the plate or the housing 78 and subsequent deformation. To facilitate the insertion of the carrier 60 into the end shield 42, the two terminal leads 88 and 90 are passed through slots 96 provided in the end shield. This ensures further that the carrier assumes its proper position in the end shield 42. Moreover, an effective support of the individual plates 64 and 70 is thereby ensured following piercing of the tie members 72.

As becomes apparent particularly from FIG. 1, the brushes 30 rest against a commutator 100 of the electric motor 4, with the diodes 22 being arranged to surround the commutator coaxially. In this arrangement, the individual diodes 22 are advantageously provided in the clearance spaces formed between the tie members 48 and the annular body 44. This results in a space-saving diode arrangement, eliminating the need for the diodes to be mounted somewhere else in the housing 2 as required by prior arrangements.

I claim:

1. In an electrical appliance, particularly for personal use, that includes an electric motor carried on a housing, a diode-brush support assembly comprising
   an end shield member of nonconducting material,
   sheet-metal carrier structure disposed on said end shield member, and
   an array of four diodes mounted on and electrically interconnected by said metal carrier structure, said carrier structure including four sheet-metal parts linked by tie portions and said metal parts having mounting means to which leads of said diodes are secured thereto as by soldering, welding or clamping,
   said sheet-metal parts being arranged in diametrically opposed pairs and fitting into clearance spaces of said end shield member, one pair of said diametrically opposed sheet-metal parts forming portions of U-shaped housings,
   a brush and biasing means disposed in each said U-shaped housing,
   said carrier structure including terminal portions for applying electrical AC power to said diodes and applying power from said diodes through said brushes to said electric motor.

2. An electrical appliance, particularly for personal use, comprising an electric motor carried on a housing, and
   a diode and brush support assembly comprising
   an end shield member of nonconducting material, said shield member being of annular configuration, and having a plurality of axially extending apertures therethrough,
   sheet-metal carrier structure disposed on said end shield member, and
   an array of diodes mounted on and electrically interconnected by said metal carrier structure, said carrier structure including four sheet-metal parts linked by tie portions and said metal parts having mounting means to which leads of said diodes are secured thereto as by soldering, welding or clamping, two of said parts forming portions of U-shaped housings, a brush and a spring disposed in each said U-shaped housing, each said U-shaped housing having a laterally projecting land which is bent about 90 degrees and serves as an abutment for said spring, said carrier structure including terminal lug portions extending through said apertures in said end shield member for applying electrical AC power to said diodes and applying power from said diodes through said brushes to said electric motor.

3. An appliance as claimed in claim 2 wherein said sheet metal parts are arranged in diametrically opposite pairs and fit into clearance spaces of said end shield member.

4. An appliance as claimed in claim 2 wherein in said assembly of said carrier structure in said end shield, each U-shaped housing of said carrier structure is placed over a U-shaped housing in said end shield, thereby forming an internally open chamber for accommodating a brush and a spring.

5. An appliance as claimed in claim 1 wherein said end shield member comprises an integral annular body portion and a coaxially arranged bearing portion for receiving the collector of said electric motor, with said bearing portion being fixedly connected with said annular body portion by means of tie integral members arranged in cross shape.

6. An appliance as claimed in claim 5, wherein said end shield member has small pins extending axially to the longitudinal axis of the electric motor, said pins being engaged in bores provided in said sheet metal parts.

7. An appliance as claimed in claim 1 wherein said tie portions for linking adjacent plates are severed following mounting of said diodes, with the diodes assuming at least part of the supporting function of said tie portions.

8. An appliance as claimed in claim 7 wherein the longitudinal axes of said diodes extend approximately parallel to the longitudinal axes of said tie portions.

9. An appliance as claimed in claim 1 wherein two opposite parts are provided with terminal leads for electrical inputs, said leads being bent at right angles and being passed through openings in said end shield member.

10. An appliance as claimed in claim 1 wherein said diodes are arranged in openings formed by tie members arranged in cross shape and an integral annular body portion of said end shield member.

11. An appliance as claimed in either claim 1 or 2 wherein at least one mounting means for a lead of each diode is resiliently arranged on said carrier structure.

* * * * *